(12) United States Patent
Nagatomo et al.

(10) Patent No.: US 9,680,296 B2
(45) Date of Patent: Jun. 13, 2017

(54) FAULT DETECTION PROTECTING CIRCUIT

(71) Applicant: DENSO CORPORATION, Kariya, Aichi-pref. (JP)

(72) Inventors: Hideharu Nagatomo, Kariya (JP); Akira Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 37 days.

(21) Appl. No.: 14/770,724

(22) PCT Filed: Feb. 6, 2014

(86) PCT No.: PCT/JP2014/000634
§ 371 (c)(1),
(2) Date: Aug. 26, 2015

(87) PCT Pub. No.: WO2014/132571
PCT Pub. Date: Sep. 4, 2014

(65) Prior Publication Data
US 2016/0013629 A1  Jan. 14, 2016

(30) Foreign Application Priority Data
Feb. 27, 2013 (JP) .................. 2013-037119

(51) Int. Cl.
*H02H 3/08* (2006.01)
*H02H 5/04* (2006.01)
(Continued)

(52) U.S. Cl.
CPC ......... *H02H 3/085* (2013.01); *B60R 16/0315* (2013.01); *H02H 5/04* (2013.01); *H04B 17/309* (2015.01)

(58) Field of Classification Search
USPC ................................ 361/93.8, 103
See application file for complete search history.

(56) References Cited

U.S. PATENT DOCUMENTS

| 6,373,671 B1 * | 4/2002 | Watanabe | H03K 17/0822 361/103 |
| 2003/0202305 A1 * | 10/2003 | Engel | H02H 3/085 361/93.8 |
| 2004/0184209 A1 * | 9/2004 | Yamamoto | G01K 7/01 361/103 |

FOREIGN PATENT DOCUMENTS

| JP | 2012095117 A | 5/2012 |
| JP | 2012210005 A | 10/2012 |

OTHER PUBLICATIONS

International Search Report and Written Opinion (in Japanese with English Translation) for PCT/JP2014/000634, mailed Mar. 11, 2014; ISA/JP.

* cited by examiner

*Primary Examiner* — Scott Bauer
(74) *Attorney, Agent, or Firm* — Harness, Dickey & Pierce, P.L.C.

(57) ABSTRACT

In a fault detection protecting circuit, an overheat detection unit is provided for each of communication channels on an IC chip, and detects the temperature in each communication channel as the detected temperature. A chip temperature detection unit detects the temperature at an arbitrary position on the IC chip as a reference temperature. A detection unit sets a predetermined ratio value regarding the difference between an overheat protective temperature and a reference temperature based on the detected temperature in each communication channel and the reference temperature, and identifies that the communication channel is in a state before overheat detection when the detected temperature exceeds a threshold value. A stop-control unit stops the output from one of the communication channels when the detection unit identifies that the communication channel is in a state before (Continued)

overheat detection and when it is identified that the communication channel is in an overcurrent state.

6 Claims, 3 Drawing Sheets

(51) Int. Cl.
*H04B 17/309* (2015.01)
*B60R 16/03* (2006.01)

FAULT DETECTION PROTECTING CIRCUIT

CROSS REFERENCE TO RELATED APPLICATIONS

This application is a U.S. National Phase Application under 35 U.S.C. 371 of International Application No. PCT/JP2014/000634 filed on Feb. 6, 2014 and published in Japanese as WO 2014/132571 A1 on Sep. 4, 2014. This application is based on and claims the benefit of priority from Japanese Patent Application No. 2013-37119 filed on Feb. 27, 2013. The entire disclosures of all of the above applications are incorporated herein by reference.

TECHNICAL FIELD

The present disclosure relates to a fault detection protecting circuit configured to protect a communication circuit in which a plurality of communication transceivers are integrated onto one single IC chip and detects a fault in the communication circuit.

BACKGROUND ART

With regard to an IC (Integrated Circuit) chip for communication, when a specified communication bus is shorted to a power supply or ground, it is possible that the temperature of the IC chip rises with the flow of an overcurrent and hence causes the thermal breakdown of a device. Typically, an overheat protecting function is provided for preventing the thermal breakdown of a device caused by an overcurrent, and the overheat protecting function is operated to stop an operation when the temperature reaches the specific temperature (i.e., the temperature is equal to or higher than 170° C. since an IC is operated at the temperature which is less than or equal to, for example, 150° C.).

PRIOR ART LITERATURES

Patent Literature

Patent Document 1: JP 2012-210005 A

SUMMARY OF THE INVENTION

Recently, it has been proposed to provide a configuration in which a plurality of communication transceivers are integrated onto one IC chip for an ECU (Electronics Control Unit) as the kernel of a vehicular communication infrastructure such as a central gateway. With regard to the IC chip on which a plurality of communication transceivers are integrated, when an overheat protecting function is activated due to a fault in one of the communication transceivers, the other normal communication channels also stop an operation. As a result, the normal communication bus compulsorily stops data communication that may affect the vehicular behavior in a case where the ECU includes a gateway function. In addition, it is possible that the normal communication channel stops data communication when an external noise such as a wireless radio wave affects the overheat protecting function. Moreover, it is possible that the normal communication channel stops data communication due to an error operation performed by an overcurrent protecting function similarly in the IC chip incorporating the overcurrent protecting function.

In view of these situations, the present disclosure aims to provide a fault detection protecting circuit that can avoid the activation of a protecting function in one communication channel from affecting the other normal communication channels and enhance noise resistance characteristics for a configuration in which a plurality of communication transceivers are integrated onto a single IC chip.

A fault detection protecting circuit according to an embodiment of the present disclosure includes an overheat detection unit, a chip temperature detection unit, a detection unit and a stop-control unit. The overheat detection unit is arranged corresponding to each of a plurality of communication channels on an IC chip to detect a temperature in each of the plurality of communication channels as a detected temperature. The chip temperature detection unit is arranged at an arbitrary position on the IC chip, and detects a temperature at the arbitrary position on the IC chip as a reference temperature. The detection unit sets a predetermined ratio value as a threshold value with regard to the difference between an overheat protection temperature and a reference temperature based on the detected temperature in each of the communication channels detected by the overheat detection unit and the reference temperature detected by the chip temperature detection unit, and identifies that the communication channel is brought into a state prior to overheat detection when the detected temperature exceeds the threshold value. The stop-control unit stops an output from one of the plurality of communication channels when the detection unit identifies that the one of the plurality of communication channels is brought into a state prior to overheat detection and when it is identified that the one of the plurality of communication channels is brought into an overcurrent state.

In other words, a threshold value is set for each communication channel as a comparison reference in which whether the communication channel is brought into a state prior to overheat detection, and the output from one communication channel is stopped when it is identified that one of the communication channels is in an overcurrent state caused by some factors and that the one of the communication channels is in a state prior to overheat detection. Therefore, it can be avoided that the activation of the overheat protecting function in one of the communication channels affects the other channels so that data communication can still be carried out in the normal communication channels. In addition, the determination of logical product of being in an overcurrent state and being in a state prior to overheat detection is configured as the condition to stop an output from the communication channel. Therefore, when it is only detected that an error operation has occurred due to a wireless radio wave as an external nose or when it is only detected that the communication channel is brought into an overcurrent state, the stop of an output from the communication channel can be avoided and hence the noise-resistance characteristics can be enhanced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
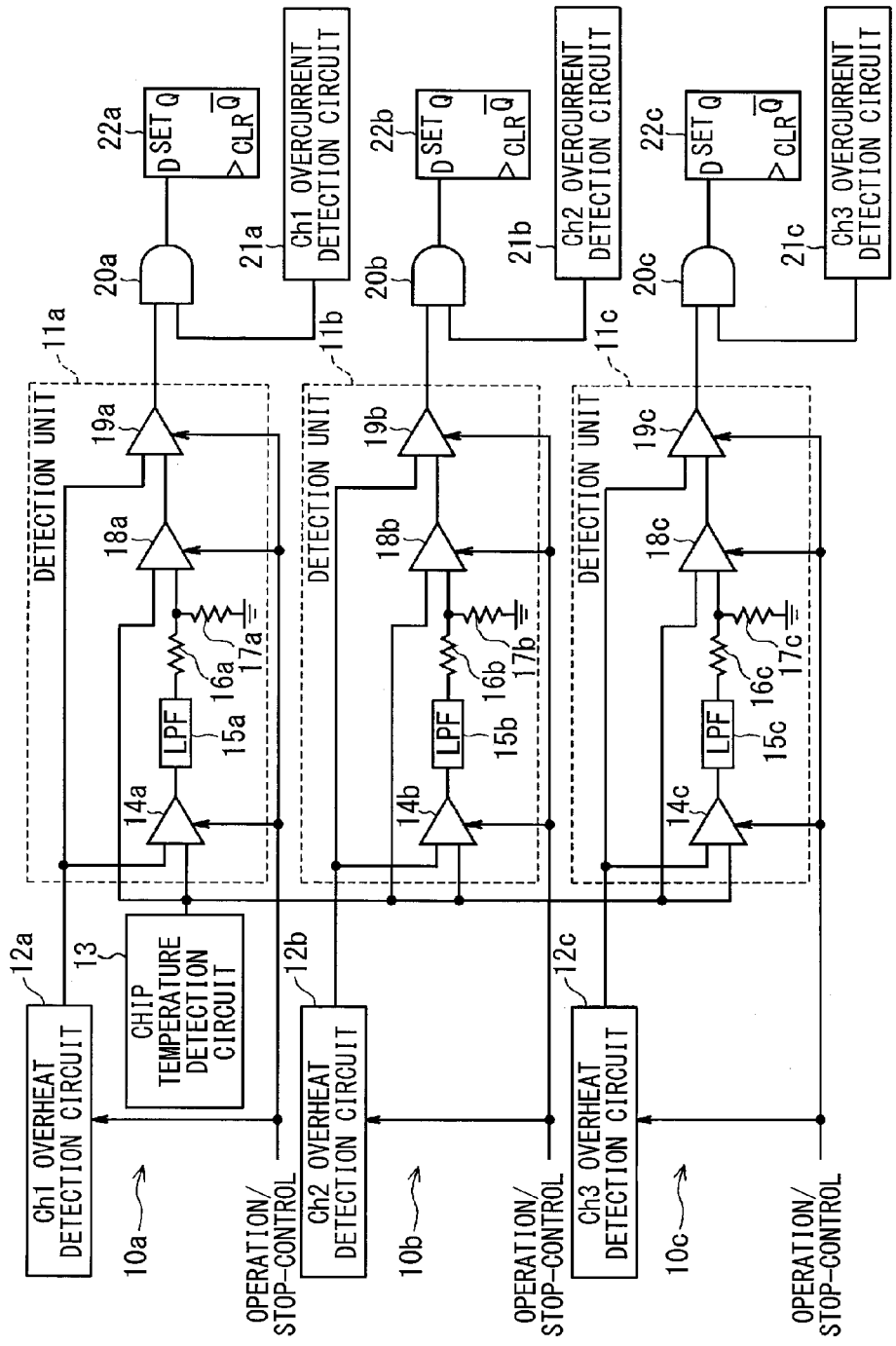
FIG. 1 is a functional block diagram that illustrates a first embodiment of the present disclosure.
Figure 2:
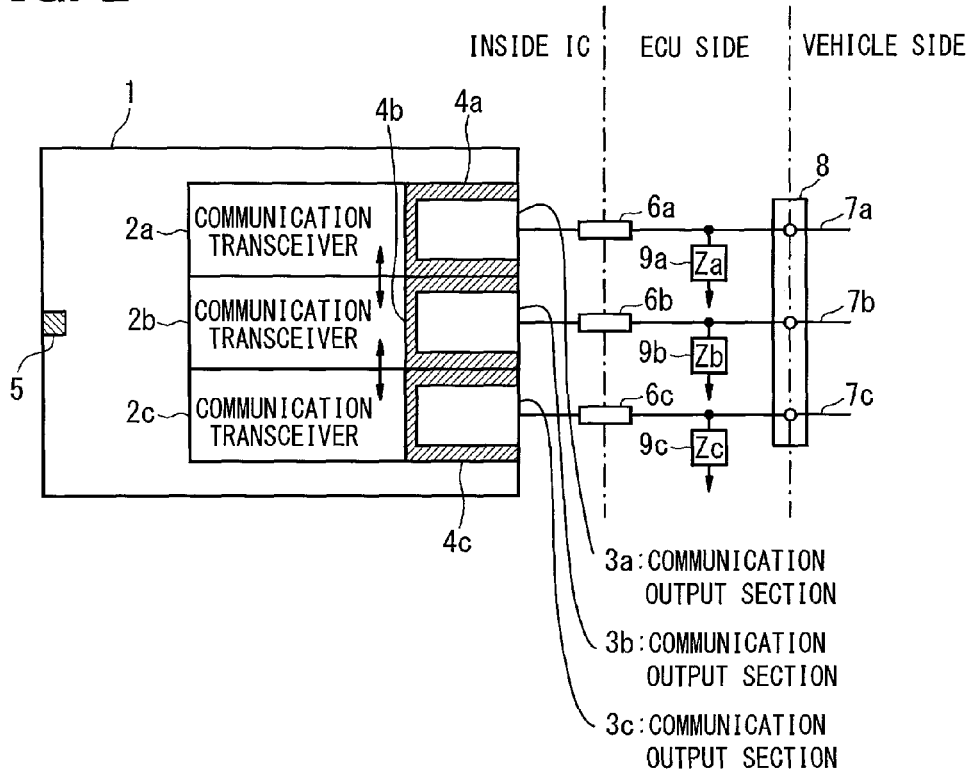
FIG. 2 is a diagram that shows the arrangement of an overheat detection unit and a chip temperature detection unit.
Figure 3:
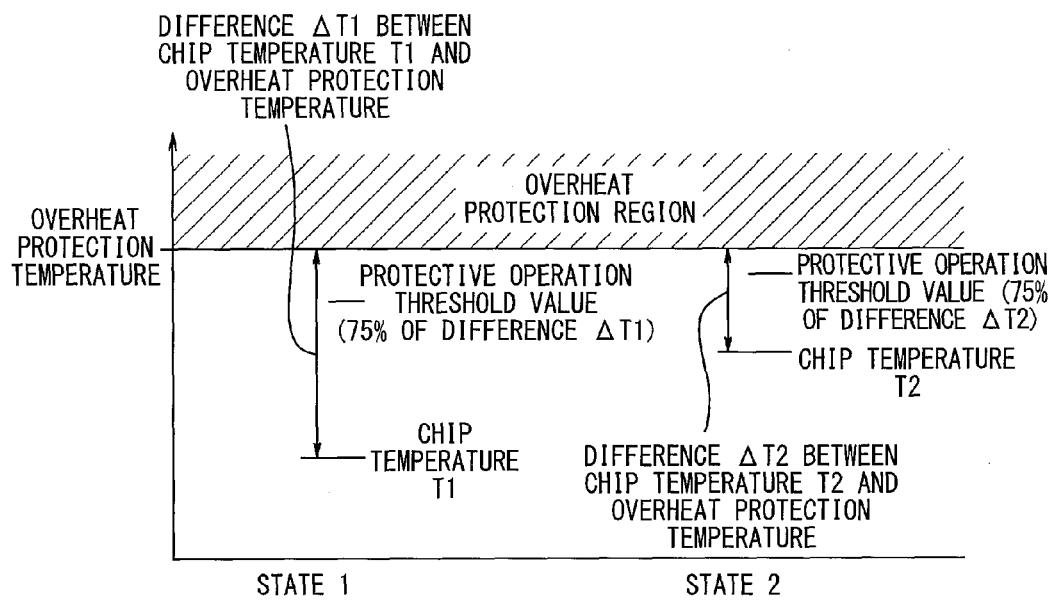
FIG. 3 is a diagram that shows the relationship among an overheat protection temperature, a chip temperature and a protective operation threshold value.

The following describes a first embodiment of the present disclosure with reference to FIGS. 1 to 3. The present embodiment describes a configuration applied to an IC chip to be mounted on an ECU (Electronic Control Unit) as the kernel of a vehicular communication infrastructure. Alternatively, the present embodiment describes the configuration in which three transceivers for communication are integrated onto one single chip as the configuration in which a plurality of communication transceivers are integrated onto one single chip. As shown in FIG. 2, three communication transceivers 2a to 2c are arranged to be closed to each other on an IC chip 1, and three communication output sections 3a to 3c are arranged to be in accordance with three communication transceivers 2a to 2c. Additionally, three communication transceivers 2a to 2c are easily influenced by heat from other communication transceivers.

Overheat detection units 4a to 4c are arranged around the communication output sections 3a to 3c for detecting each individual temperature of three communication output sections 3a to 3c. In other words, the overheat detection units 4a to 4c are arranged to detect each individual temperature (i.e., detected temperature) of three communication channels. A chip temperature detection unit 5 is arranged at the side (i.e., the left side in FIG. 2) opposite to the side where the overheat detection units 4a to 4c are arranged (i.e., the right side in FIG. 2) for detecting the temperature (i.e., reference temperature) in the area. In other words, the chip temperature detection unit 5 is arranged at the farthermost position from three communication output sections 3a to 3c on the IC chip 1, and is arranged at the position where the fewest thermal effect is produced from three communication output sections 3a to 3c. Alternatively, three communication output sections 3a to 3c are connected to communication buses 7a to 7c via IC terminals 6a to 6c respectively. The communication buses 7a to 7c are divided into an ECU side and a vehicle side by a connector 8, and communication protection circuits 9a to 9c and end terminals (in some instances) are connected at the ECU side. It is noted that the communication buses 7a to 7c may have a single line or plural lines; however, the communication buses 7a to 7c are illustrated by a single line for simplicity.

Fault detection protecting circuits 10a to 10c are individually provided for three communication channels (i.e., communication channels 1 to 3) corresponding to three communication transceivers 2a to 2c as shown in FIG. 1. This section describes the fault detection protecting circuit 10a provided corresponding to the communication channel 1. Similarly, the fault detection protecting circuits 10b, 10c are also provided corresponding to the communication channels 2, 3. It is noted that the chip temperature detection circuit 13 is provided commonly for the fault detection protecting circuits 10a to 10c.

The fault detection protecting circuit 10a includes a detection unit 11a, an overheat detection circuit 12a, a chip temperature detection circuit 13 and an AND circuit 20a. The overheat detection circuit 12a includes the above-mentioned overheat detection unit 4a. The output terminal of the overheat detection circuit 12a is connected to one of the input terminals of a subtractor 14a, and is connected to one of the input terminals of a comparator 19a. The chip temperature detection circuit 13 includes the above-mentioned chip detection unit 5. The output terminal of the chip temperature detection circuit 13 is connected to the other input terminal of the subtractor 14a, and is connected to one of the input terminals of an adder 18a. The output terminal of the subtractor 14a is connected to the input terminal of an LPF (i.e., low-pass filter) 15a. The output terminal of the LPF 15a is grounded through a resistor 16a and a resistor 17a. The middle point between the resistor 16a and the resistor 17a is connected by the other input terminal of the adder 18a. The output terminal of the adder 18a is connected to the other input terminal of the comparator 19a. The output terminal of the comparator 19a is connected to the other input terminal of the AND circuit 20a (i.e., stop control unit). The output terminal of an overcurrent detection circuit 21a, which is provided corresponding to the communication channel 1, is connected to the other input terminal of the AND circuit 20a. The output terminal of the AND circuit 20a is connected to the input terminal of a D-type flip-flop circuit 22a.

In the detection unit 11a, the subtractor 14a computes the difference between the temperature detected by the overheat detection unit 4a in the overheat detection circuit 12a and the temperature detected by the chip temperature detection unit 5 in the chip temperature detection circuit 13. Subsequently, the difference passes through the LPF 15a to make a constant delay not to sensitively react similarly to overheat detection, and then a value is computed by partially dividing the difference of the resistances through the resistor 16a and the resistor 17a so as to obtain a constant ratio (i.e., a predetermined ratio) of the difference. That is, the value obtained by partial division depending on the resistance value of the resistor 16a and the resistance value of the resistor 17a corresponds to the value having a constant ratio with regard to the difference between the current temperature of the IC chip 1 and the overheat protection temperature, and the value constantly changes in response to the current temperature of the IC chip 1. FIG. 3 exemplifies the case where the constant ratio is 75%. The adder 18a adds the value having a constant ratio with regard to the difference between the current temperature of the IC chip 1 and the overheat protection temperature, and computes a protective operation threshold value (i.e., threshold value) to be a comparison reference relative to the temperature detected by the overheat detection unit 4a in the overheat detection circuit 12a. Then, the comparator 19a compares the temperature detected by the overheat detection unit 4a in the overheat detection circuit 12a to the protective operation threshold value.

The comparator 19a outputs "0" to the AND circuit 20a when the temperature detected by the overheat detection unit 4a in the overheat detection circuit 12a does not exceed the protective operation threshold value, and the comparator 19a outputs "1" to the AND circuit 20a when the temperature detected by the overheat detection unit 4a in the overheat detection circuit 12a exceeds the protective operation threshold value. That is, the comparator 19a outputs "1" to the AND circuit 20a when the temperature detected by the overheat detection unit 4 in the overheat detection circuit 12a exceeds the protective operation threshold value (i.e., the state prior to overheat detection) even though the temperature does not reach the overheat protection temperature.

The overcurrent detection circuit 21a detects whether an overcurrent flows through the communication channel, and the circuit outputs "0" to the AND circuit 20a when the overcurrent does not flow through the channel, and outputs "1" to the AND circuit 20a when the overcurrent flows through the channel. The AND circuit 20a outputs "1" to the D-type flip-flop circuit 22a when the input from the detection unit 11a is "1" and the input from the overcurrent detection circuit 21a is "1." When the input from the detection unit 11a is "1" and the input from the overcurrent detection circuit 21a is "1," the communication channel is brought into an overcurrent state caused by some factors or into a state prior to overheat detection.

When the D-type flip-flop circuit 22a stops the output of the communication channel when "1" is inputted from the AND circuit 20a. For example, the operational power of the communication output section 3a may be blocked as the method for stopping the output of the communication channel. Alternatively, all operations may be stopped by outputting a stop control signal to each of the configuration circuits in the communication transceiver 2a. In other words, when the output of the communication channel brought into an overcurrent state and in a state prior to overheat detection is stopped, it can be prevented that the activation of an overheat protecting function in one channel affects the other communication channels so that it does not interfere data communication in the normal communication channels. If the time for conducting heat from the overheat detection unit 4a to the chip temperature detection unit 5 is sufficient, the LPF 15a may be removed. Alternatively, since the signal for identifying whether the communication channel is brought into an overcurrent state may be inputted to the AND circuit 20a, the fault detection protecting circuit 10a may not need the overcurrent detection circuit 21a as a configuration requirement. That is, the overcurrent detection circuit 21a may be provided outside the fault detection protecting circuit 10a.

According to the first embodiment as described above, with regard to the configuration where three communication transceivers 2a to 2c are integrated on one IC chip 1, a protective operation value to be a comparison reference in which whether the communication channel is brought into a state prior to overheat detection, is set for each communication channel, and when it is identified that one communication channel is brought into an overcurrent state due to some factors and one communication channel brought into an overcurrent state leads to a state prior to overheat detection, the output of one communication channel is stopped. Therefore, the activation of an overheat protecting function in one communication channel does not affect the other communication channels so that normal data communication in the communication channel can be continued. Alternatively, the logical sum of an overcurrent state and a state prior to overheat detection is determined as a condition for stopping the output of the communication channel. Accordingly, in a case of only detecting an error operation due to a wireless radio wave as external noise or only detecting an overcurrent state, it can be prevented that the output of the communication channel is stopped, and the noise resistance characteristics can be improved.

Since the chip temperature detection unit 5 is arranged at the farthest position from the overheat detection units 4a to 4c on the IC chip 1, a certain distance between the overheat detection units 4a to 4c and the chip temperature detection unit 5 can be ensured, and the influence made from the overheat detection units 4a to 4c to the temperature detection unit 5 can be inhibited. Alternatively, since the detection units 11a to 11c are individually provided for each communication channel, the states of three communication channels can be monitored so that it can be promptly detected whether each communication channel is brought into a state prior to overheat detection.

Second Embodiment

Figure 4:
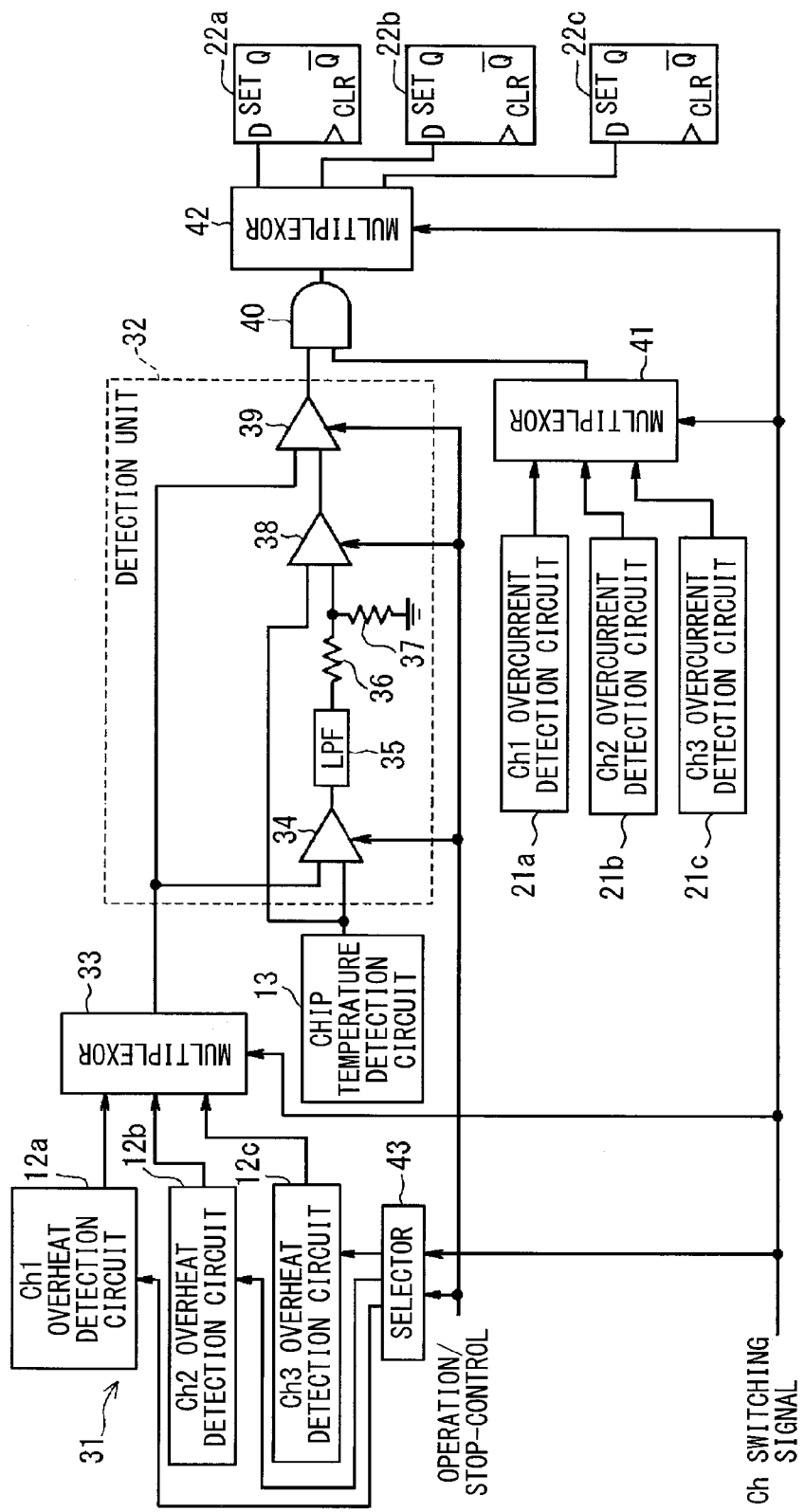
FIG. 4 is a functional block diagram that illustrates a second embodiment.

The following describes a second embodiment of the present disclosure with reference to FIG. 4. It is noted that the description of the parts identical to the one in the first embodiment is omitted, and the parts different from the one in the first embodiment is described. With regard to the first embodiment, the detection unit is individually provided for each communication channel. In the second embodiment, a detection unit is provided commonly for three communication channels.

A fault detection protecting circuit 31 includes overheat detection circuits 12a to 12c provided for each of the communication channels individually, a detection unit 32 provided commonly for the overheat detection circuits 12a to 12c, and a chip temperature detection circuit 13. The detection unit 32 includes a subtractor 34, an LPF 35, resistors 36, 37, an adder 38 and a comparator 39. The subtractor 34, the LPF 35, the resistors 36, 37, the adder 38 and the comparator 39 correspond to the subtractors 14a to 14c, LPFs 15a to 15c, the resistors 16a to 16c and 17a to 17c, the adders 18a to 18c and the comparators 19a to 19c respectively described in the first embodiment. An AND circuit 40 also corresponds to the AND circuits 20a to 20c described in the first embodiment.

A multiplexor 33 switches the inputs from the overheat detection circuits 12a to 12c respectively in each of the communication channels to a time series at an arbitrary timing in response to the input of a channel switching signal and outputs the time series to the detection unit 32 by exclusive control. Similarly, a multiplexor 41 switches the inputs provided from the overcurrent detection circuits 21a to 21c respectively in each of the communication channels to a time series in an arbitrary timing in response to the input of a channel switching signal and outputs the time series to the AND circuit 30 by exclusive control. A multiplexor 42 changes the output from the AND circuit 40 to a time series at an arbitrary timing in response to the input of a channel switching signal and outputs the time series to D-type flip-flop circuits 22a to 22c by exclusive control.

A selector 43 outputs a stop control signal to the overheat detection circuits 12a to 12c when any one of the communication channels is in an overcurrent state by some factors and when any one of the communication channels, which has been in an overcurrent state, is in a state prior to detecting overheat. The multiplexor 33, the multiplexor 41, the multiplexor 42 and the selector 43 input the identical channel switching signal so that the switching control of the input from the overheat detection circuits 12a to 12c, the switching control of the input from the overcurrent detection circuits 21a to 21c, the switching control of output to the D-type flip-flop circuits 22a to 22c and the switching control of the output of the stop control signals to the overheat detection circuits 12a to 12a are in synchronization.

The second embodiment as described above differs from the first embodiment in that the detection unit 22 is provided commonly for three communication channels. However, the other parts in the second embodiments have functions similar to the one in the first embodiment; therefore, the functional effects identical to the one in the first embodiment can be attained. In other words, it can be avoided that the activation of the overheat protecting function in one communication channel affects the other channel so that data communication in the normal channel can still be performed. Alternatively, when it is only detected that an error operation has occurred due to wireless radio wave as external noise or when it is only detected that one of the communication channels is in an overcurrent state, the stop of an output from the communication channel can be avoided and hence noise resistance characteristics can be enhanced. In this situation, since the detection unit 22 is provided commonly for three communication channels, the configuration can be simplified.

Modification

The present disclosure is not restricted to the above-mentioned embodiments. For instance, the present disclosure may be modified or expanded in the following manner.

The number of communication transceivers arranged on one IC chip may be two or more than four. The chip temperature detection unit can detect the temperature at any position on the IC chip, and it may be arranged at not only the end side on the IC chip but also any other position as long as the position does not receive thermal effect from the communication output sections. Additionally, the chip temperature detection unit may be provided individually to each of the plurality of communication channels. With regard to the detection unit, the resistance value of a resistor to be grounded can be set by an external element so that the value of a constant ratio can be changed and the protective operation threshold value can also be changed.

What is claimed is:

1. A fault detection protecting circuit configured to protect a communication circuit in which a plurality of communication transceivers are integrated onto one IC chip, and to detect a fault in the communication circuit, the fault detection protecting circuit comprising:
    an overheat detection unit that is arranged corresponding to each of a plurality of communication channels in response to the plurality of communication transceivers on the IC chip, and detects a plurality of temperatures correspondingly in the plurality of communication channels as a plurality of detected temperatures;
    a chip temperature detection unit that is arranged at an arbitrary position on the IC chip, and detects a temperature at the arbitrary position on the IC chip as a reference temperature;
    a detection unit that sets a predetermined ratio value with regard to a difference between an overheat protective temperature and the reference temperature as a threshold value based on the plurality of detected temperatures correspondingly in the plurality of communication channels detected by the overheat detection unit and the reference temperature detected by the chip temperature detection unit, and specifies at least one of the plurality of communication channels brought into a state prior to overheat detection when at least one of the plurality of detected temperatures correspondingly in the at least one of the plurality of communication channels exceeds the threshold value; and
    a stop-control unit that stops an output from the at least one of the plurality of communication channels when the detection unit specifies the at least one of the plurality of communication channels brought into a state prior to overheat detection and the at least one of the plurality of communication channels brought into an overcurrent state.

2. The fault detection protecting circuit according to claim 1,
    wherein the overheat detection unit is arranged at one side on the IC chip, and
    wherein the chip temperature detection unit is provided at another side on the IC chip.

3. The fault detection protecting circuit according to claim 1,
    wherein the detection unit is arranged individually corresponding to each of the plurality of communication channels.

4. The fault detection protecting circuit according to claim 1,
    wherein the detection unit is arranged commonly for the plurality of communication channels.

5. The fault detection protecting circuit according to claim 1,
    wherein the predetermined ratio value with regard to the difference between the overheat protective temperature and the reference temperature set in the detection unit is variable.

6. The fault detection protecting circuit according to claim 1, further comprising:
    an overcurrent detection circuit that identifies whether one of the plurality of communication channels is in an overcurrent state.

* * * * *